United States Patent [19]
Meltzer et al.

[11] Patent Number: 6,065,110
[45] Date of Patent: *May 16, 2000

[54] METHOD AND APPARATUS FOR LOADING AN INSTRUCTION BUFFER OF A PROCESSOR CAPABLE OF OUT-OF-ORDER INSTRUCTION ISSUE

[75] Inventors: David Meltzer, Wappingers Falls; Joel Abraham Silberman, Somers, both of N.Y.

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 09/020,631

[22] Filed: Feb. 9, 1998

[51] Int. Cl.[7] ................................................. G06F 9/30
[52] U.S. Cl. .......................... 712/217; 712/215; 712/208; 711/214
[58] Field of Search ................................. 712/217, 215, 712/23, 208; 711/214

[56] References Cited

U.S. PATENT DOCUMENTS

| | | | |
|---|---|---|---|
| 3,771,141 | 11/1973 | Culler | 712/203 |
| 4,760,518 | 7/1988 | Potash et al. | 710/107 |
| 4,953,121 | 8/1990 | Muller | 712/241 |
| 5,467,473 | 11/1995 | Kahle et al. . | |
| 5,481,683 | 1/1996 | Karim . | |
| 5,560,032 | 9/1996 | Nguyen et al. . | |
| 5,586,278 | 12/1996 | Papworth et al. . | |
| 5,590,295 | 12/1996 | Deosaran et al. . | |
| 5,627,983 | 5/1997 | Popescu et al. . | |
| 5,630,157 | 5/1997 | Dwyer, III . | |
| 5,651,125 | 7/1997 | Witt et al. . | |
| 5,761,491 | 6/1998 | Circello et al. | 712/244 |

OTHER PUBLICATIONS

IBM Technical Disclosure Bulletin, "RISC Superscalar Pipeline Out–of–Order Statistics Gathering and Analysis", vol. 37, No. 04B, Apr. 1994, pp. 385–387.

*Primary Examiner*—Larry D. Donaghue
*Assistant Examiner*—Gautam R. Patel
*Attorney, Agent, or Firm*—Casimer K. Salys; Felsman, Bradley, Vaden, Gunter & Dillon, LLP

[57] ABSTRACT

A method and apparatus for loading an instruction buffer of a processor capable of out-of-order instruction issue are disclosed. The processor capable of out-of-order instruction issue includes an instruction cache having multiple cache lines. The instruction cache is coupled to an instruction buffer via a multiplexor. The instruction buffer includes several slots, and these slots are sequentially filled by instructions from the instruction cache under the supervision of the multiplexor. The slot in which the first instruction resides is dictated by a fetch address. Any empty slot in the instruction buffer will be filled with instructions from a subsequent cache line of the instruction cache if the first instruction does not reside in the first slot of the instruction buffer.

15 Claims, 4 Drawing Sheets

METHOD AND APPARATUS FOR LOADING AN INSTRUCTION BUFFER OF A PROCESSOR CAPABLE OF OUT-OF-ORDER INSTRUCTION ISSUE

BACKGROUND OF THE INVENTION

1. Technical Field

The present invention relates to a method and apparatus for data processing in general, and in particular to a method and apparatus for loading an instruction buffer. Still more particularly, the present invention relates to a method and apparatus for loading an instruction buffer of a superscalar processor capable of out-of-order instruction issue.

2. Description of the Prior Art

Most, if not all, superscalar processors are capable of performing out-of-order instruction issue. Although there are many implementation schemes for out-of-order instruction issue, the key element for all these schemes is an issue queue (or issue logic) that determines the actual order of execution based on the resolution of data dependencies and the availability of execution resources, instead of the order in which instructions appear within the program.

Nevertheless, instructions are typically stored according to program order in a cache line within an instruction cache (I-cache) of a processor. Furthermore, each unit of access to the I-cache is generally more than one instruction. For example, for a processor architecture that has a four-byte instruction length, each I-cache access may be 32 bytes wide, which equals to a total of eight instructions per I-cache access. Even with the simplest I-cache design, these instructions must be multiplexed into an instruction buffer having eight or less slots, before sending to the issue queue.

Following along the above example, eight instructions are initially read from the I-cache. The fetch address of the first instruction is then utilized to control an 8-to-1 multiplexor to gate the first four instructions into an instruction buffer with, for example, four slots. The fetch address is also utilized to select a target instruction along with the next three instructions from the eight instructions, to gate into the instruction buffer. All four instructions are gated into the instruction buffer in execution order instead of program order. With this arrangement, when the fetch address is the result of a (predicted or actual) branch instruction, the first instruction to be gated into the instruction buffer may be any one of the eight instructions. Thus, if the target address of the branch instruction points to the last instruction, the next to last instruction, or even the second to last instruction of the I-cache access, then not all four slots within the instruction buffer will be completely filled, resulting in a loss of dispatch bandwidth. Consequently, it would be desirable to provide an improved method and apparatus for loading an instruction buffer without sacrificing dispatch bandwidth or cache efficiency.

SUMMARY OF THE INVENTION

In view of the foregoing, it is therefore an object of the present invention to provide an improved method and apparatus for data processing.

It is another object of the present invention to provide an improved method and apparatus for loading an instruction buffer.

It is yet another object of the present invention to provide an improved method and apparatus for loading an instruction buffer of a superscalar processor capable of out-of-order instruction issue.

In accordance with the method and apparatus of the present invention, a processor capable of out-of-order instruction issue includes an instruction cache having multiple cache lines. The instruction cache is coupled to an instruction buffer via a multiplexor. The instruction buffer includes several slots, and these slots are sequentially filled by instructions from the instruction cache under the supervision of the multiplexor. The slot in which the first instruction resides is dictated by a fetch address. Any empty slot in the instruction buffer will be filled with instructions from a subsequent cache line of the instruction cache if the first instruction does not reside in the first slot of the instruction buffer.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

The present invention may be implemented in a variety of superscalar processors. For the purpose of illustration, a preferred embodiment of the present invention, as described below, is implemented in a PowerPC™ family processor manufactured by International Business Machines Corporation. Further, although the preferred embodiment as described below is related to a fixed-length instruction set according to a reduced instruction set computer (RISC) architecture, the principles shown may also be applicable to any type of instruction set architecture.

Figure 1:
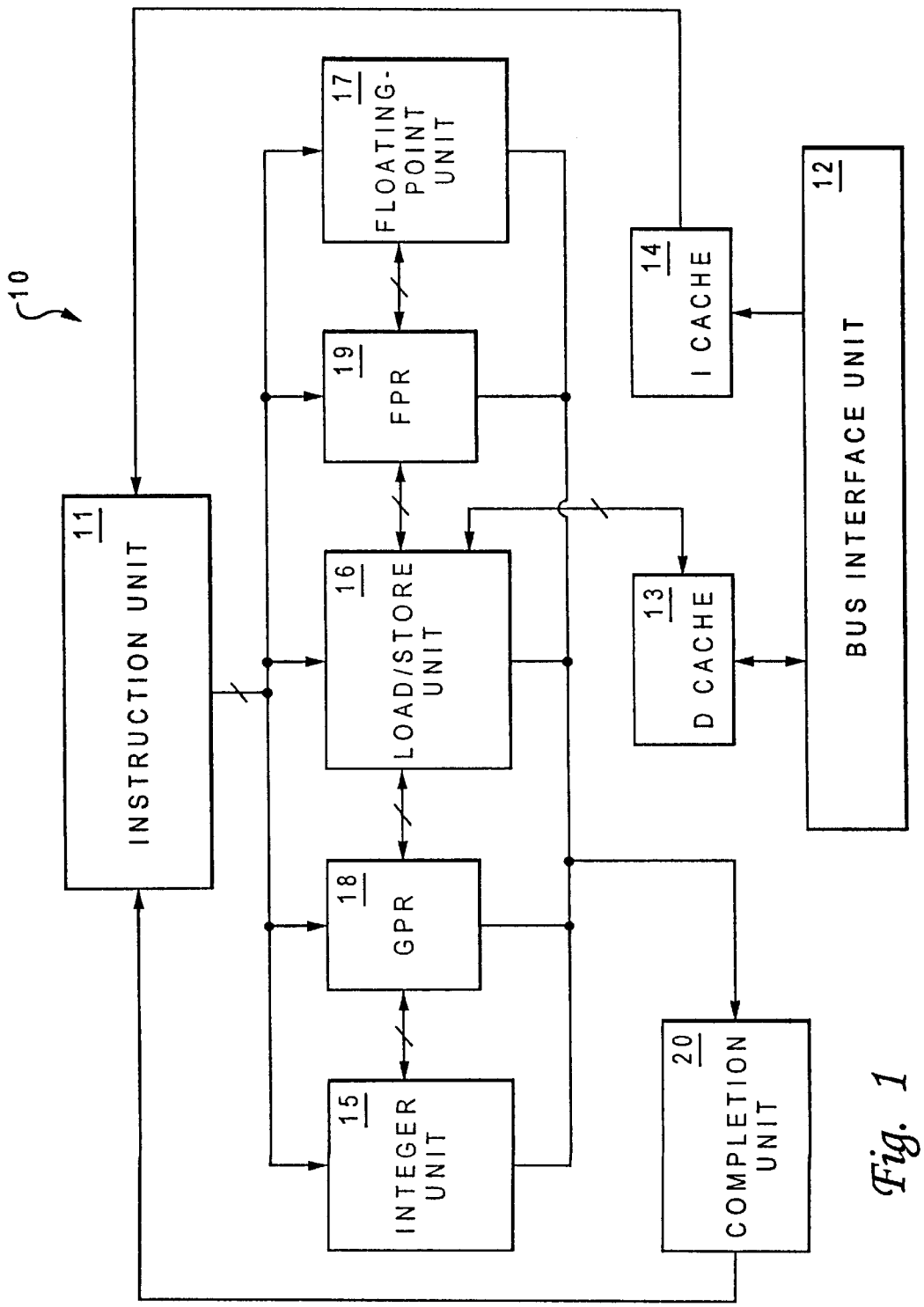
FIG. 1 is a block diagram of a processor capable of out-of-order instruction issue, in accordance with a preferred embodiment of the present invention.

Referring now to the drawings and in particular to FIG. 1, there is depicted a block diagram of a processor capable of out-of-order instruction issue, in accordance with a preferred embodiment of the present invention. Within a processor 10, a bus interface unit 12 is coupled to a data cache 13 and an instruction cache 14. Both data cache 13 and instruction cache 14 are high speed caches which enable processor 10 to achieve a relatively fast access time to a subset of data or instructions previously transferred from a main memory (not shown). Instruction cache 14 is further coupled to an instruction unit 11 which can fetch instructions from instruction cache 14.

Processor 10 includes three execution units, namely, an integer unit 15, a load/store unit 16, and a floating-point unit 17. Each of execution units 15–17 can execute one or more classes of instructions, and all execution units 15–17 operate concurrently during each processor cycle. After execution has terminated, execution units 15–17 store data results to a rename buffer, depending upon the instruction type. Then, any one of execution units 15–17 signals a completion unit 20 that the execution of an instruction has finished. Finally, instructions are completed in program order by transferring result data from the respective rename buffer to a general purpose register 18 or a floating-point register 19, accordingly.

Figure 2:
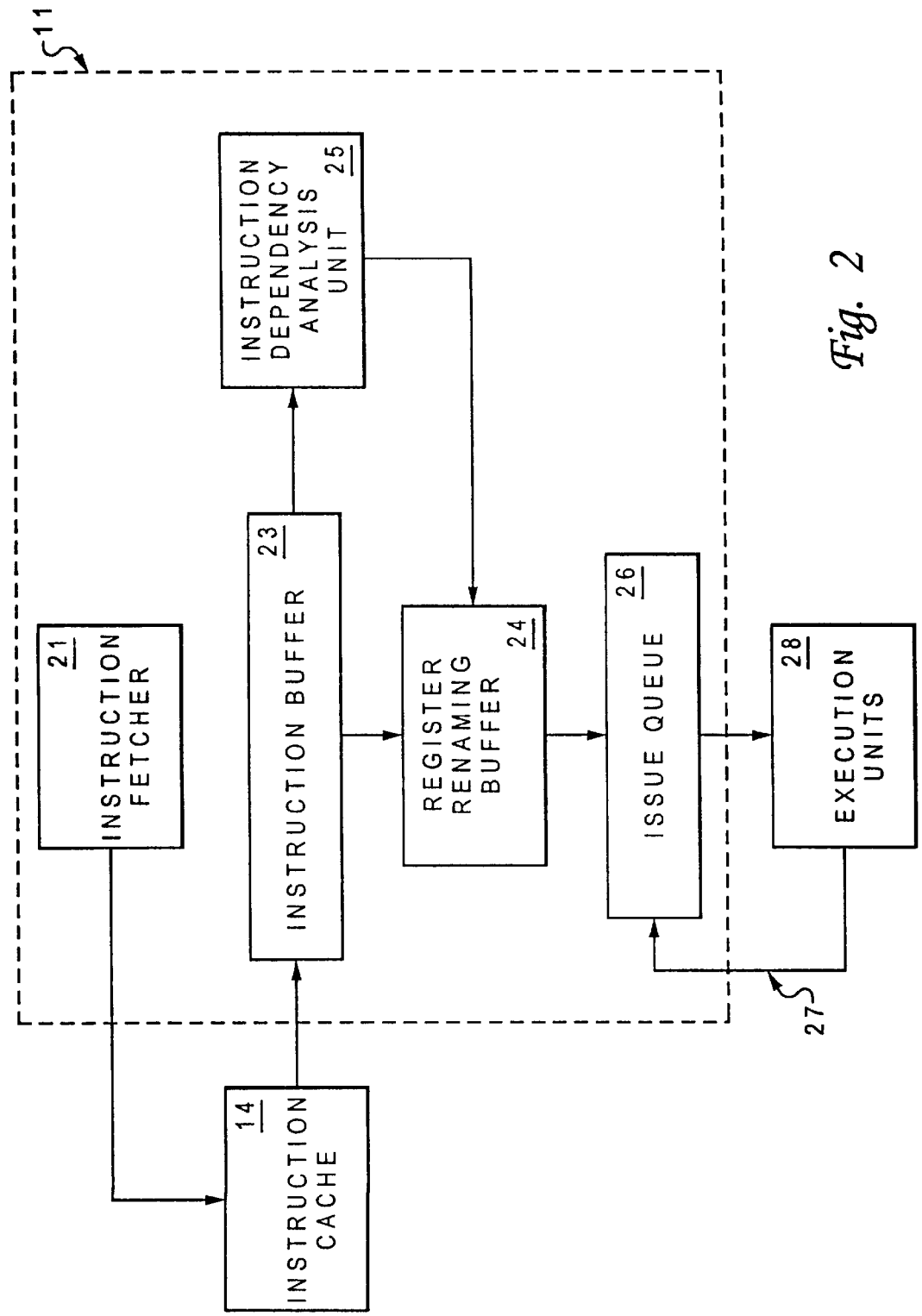
FIG. 2 is a block diagram of an out-of-order instruction issue mechanism for the processor from FIG. 1.

With reference now to FIG. 2, there is illustrated a block diagram of an out-of-order instruction issue mechanism for processor 10 of FIG. 1. As shown, instruction fetcher 21 generates an address which causes an instruction to be fetched from instruction cache 14 (from FIG. 1). The fetched instructions (as mentioned previously, more than one instruction are typically fetched from an instruction cache) are then latched into an instruction buffer 23 from instruction cache 14. The instructions within instruction buffer 23 are subsequently analyzed for determining their corresponding source addresses and target addresses, types of execution units required, and any other information that are needed to actually execute these instructions. Those instructions that possess a register target must have their register targets renamed. The renamed name of the register operand sources must also be determined. Both of the above two functions are performed within a register renaming buffer 24.

In addition, the instructions which are in instruction buffer 23 may have dependencies. For example, instruction 2 in instruction buffer 23 may utilize a register target stored by instruction 1. These dependencies between instructions within instruction buffer 23 are analyzed by an instruction dependency analysis unit 25, whose output modifies the behavior of the renaming logic within register renaming buffer 24. This is required because register renaming buffer 24 does not yet have information about the instructions within instruction buffer 23. The analyzed instruction data and text with the renamed register information are then moved into an issue queue 26. Issue queue 26 receives information from a corresponding one of execution units 28 (i.e., execution units 15–17 from FIG. 1) via status lines 27 to identify an instruction within issue queue 26 having all data available necessary for execution. Such an instruction is deemed "ready for issue" and can be sent to one of execution units 28 that is currently "free." All components except instruction cache 14 and execution units 28, as depicted in FIG. 2, preferably reside within instruction unit 11 of FIG. 1.

Figure 3:
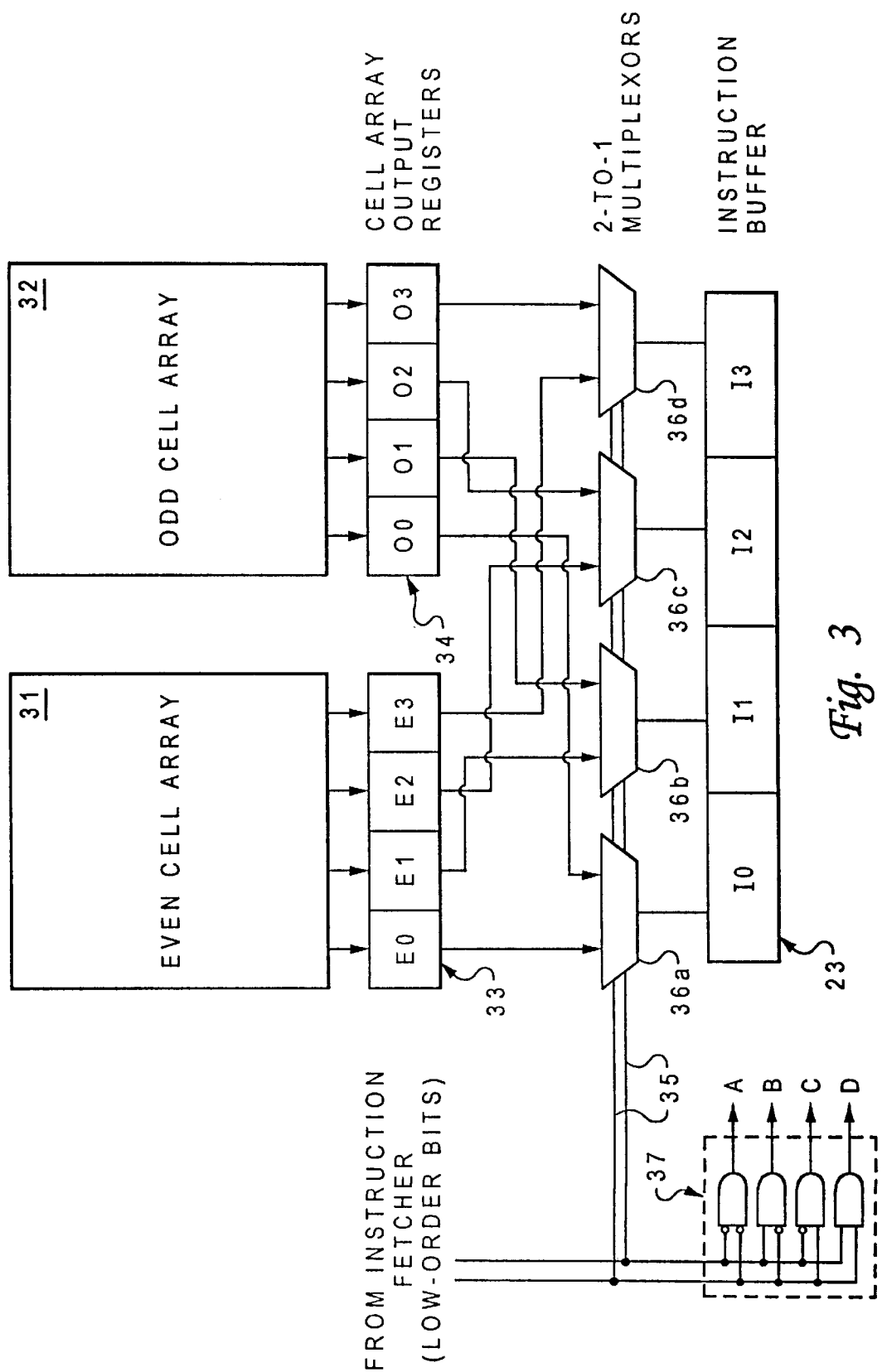
FIG. 3 is an apparatus for loading instructions to an instruction buffer, in accordance with a preferred embodiment of the present invention.

Referring now to FIG. 3, there is illustrated an apparatus for loading instructions to an instruction buffer, in accordance with a preferred embodiment of the present invention. In this implementation, instruction cache 14 (from FIG. 2) is preferably divided into an even cell array 31 and an odd cell array 32 to maintain a square geometry desirable for maximal areal density. Even cell array 31 and odd cell array 32 are connected to cell array output registers 33 and 34, respectively. Both output registers 33, 34 are coupled to four 2-to-1 multiplexors 36a–36d. Each of multiplexors 36a–36d are individually coupled to a slot within instruction buffer 23.

An effective address (EA) for an instruction fetch generated by instruction fetcher 21 (from FIG. 2) is typically in the form of an EA and an EA+access width. This means if an instruction cache (I-cache) access is four instructions wide with four bytes per instruction, then an EA and an EA+16 are generated (assuming byte-addressing scheme is being utilized). It is understood that no additional logic is needed for this function which can be simply accomplished by shifting the decode of the address to select an adjacent wordline (or cache line) within the I-cache. This increment will be modulo the size of a wordline, taking into account the readout width. If the generated address is even, the generated address will be fed to even cell array 31 and the incremented address will be utilized for odd cell array 32. If the generated address is odd, the generated address will be fed to odd cell array 32 and the incremented address will be utilized for even cell array 31. In this way, two groups of four instructions in sequential program order are read from the I-cache and be placed into output registers 33 and 34, correspondingly. The two low-order bits 35 of a requested instruction (modulo the instruction length, in this case four bytes) and whether the starting EA utilized was even or odd (modulo the access width) are utilized to control multiplexors 36a–36d to steer the instruction bits into instruction buffer 23.

As shown, each slot within instruction buffer 23 is labelled sequentially from I0 to I3. In addition, the slots within output registers 33, 34 are also labelled from E0 to E3 for cache lines from even cell array 31 and from O0 to O3 for cache lines from odd cell array 32. In a case when the two low-order bits of a requested instruction is binary "00" and the EA of the requested instruction is even, then instruction buffer 23 will be loaded as follows: I0=E0, I1=E1, I2=E2 and I3=E3, where E0 is the requested instruction. As a result, the instructions are loaded into instruction buffer 23 in program order. However, if the two low-order bits of a requested instruction is binary "0" and the EA of the requested instruction is odd, then instruction buffer 23 will be loaded as follows: I0=E0, I1=E1, I2=O2, I3=O3, where E0 is the requested instruction. As a result, the instructions are not loaded into instruction buffer 23 in program order. In fact, the correct program order in which instructions should be loaded to instruction buffer 23 is I2, I3, I0, I1. All different cases regarding whether or not instructions will be loaded to instruction buffer 23 in program order are summarized in Table I.

TABLE I

| low-order bits | starting effective address | |
|---|---|---|
| | even cell array | odd cell array |
| 00 | in program order | in program order |
| 01 | not in program order | not in program order |
| 10 | not in program order | not in program order |
| 11 | not in program order | not in program order |

Under the prior art, instruction dependency analysis unit 25 (from FIG. 2) takes advantage of the fact that instructions within instruction buffer 23 are already in program order such that only a set of comparators are required to analyze the dependencies among the instructions. In the present invention, the instructions in instruction buffer 23 may not always be in program order. When the instruction in instruction buffer 23 is not in program order, instruction dependency analysis unit 25 will not correctly identify dependencies among instructions. Hence, as a preferred embodiment of the present invention, a decoder 37 is employed to assist instruction dependency analysis unit 25 to locate the first instruction within instruction buffer 23. As shown, decoder 37 includes four AND gates, some of which have negated inputs. The input for decoder 37 comes from instruction fetcher 21 of FIG. 2, and is the fetch address for the first instruction within instruction buffer 23, according to program order. The two low-order bits of the first instruction in program order in instruction buffer 23 (which may be in any of the four slots) are decoded by decoder 37. The output of decoder 37 goes to a logic circuit depicted in FIG. 4. The four possible outputs are labelled A, B, C, and D.

Figure 4:
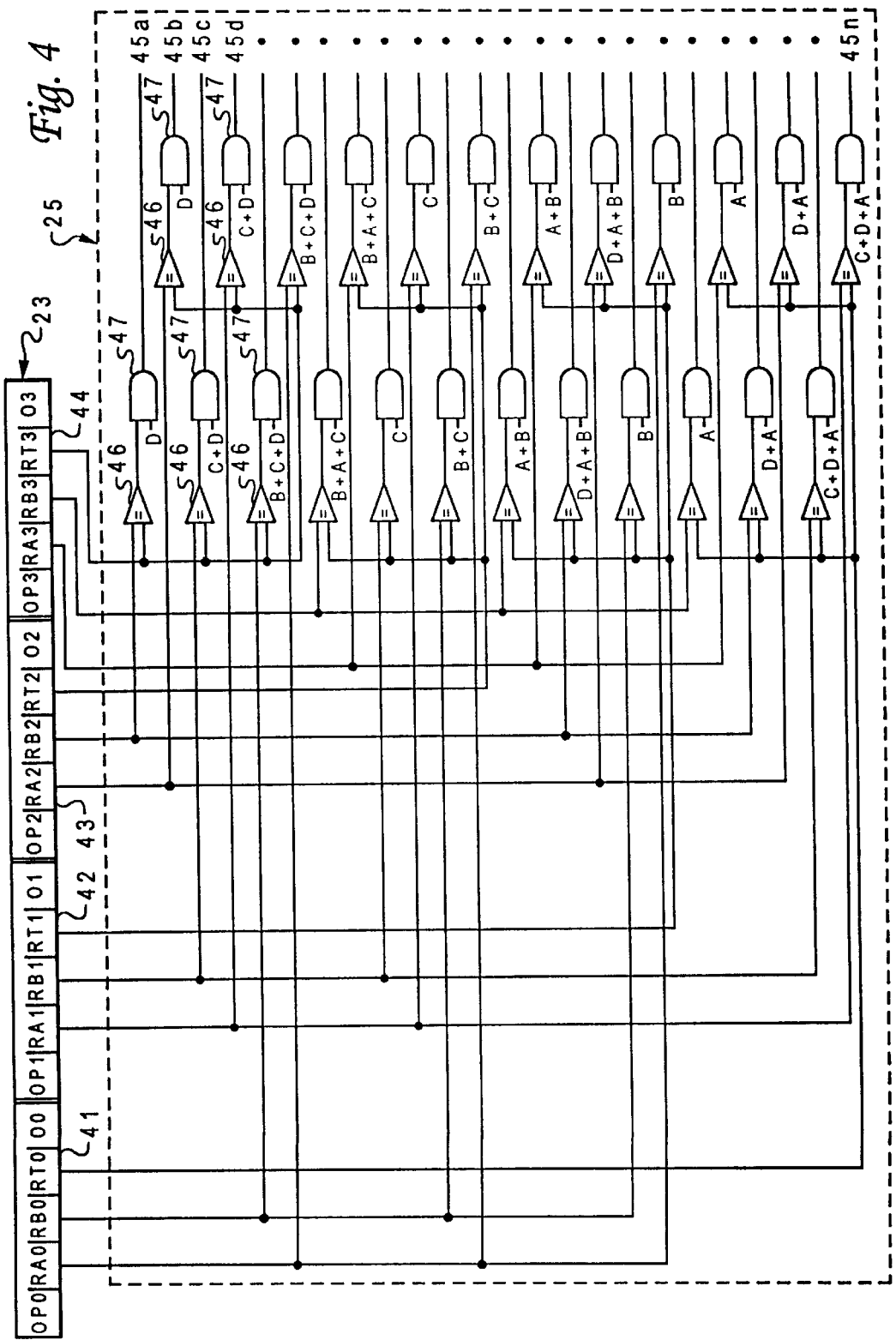
FIG. 4 is a logic circuit diagram illustrating the logic necessary to analyze the dependencies among instructions within an instruction buffer, in accordance with a preferred embodiment of the present invention.

With reference now to FIG. 4, there is depicted a logic circuit diagram illustrating the logic necessary to analyze the dependencies among instructions in instruction buffer 23, in accordance with a preferred embodiment of the present invention. This logic is preferably incorporated within instruction dependency analysis unit 25. To illustrate this logic, consider a RISC instruction set where each instruction has the form of an Opcode, a Source Register A, a Source Register B, a Target Register, and Other, which are respectively abbreviated as OP, RA, RB, RT, and 0, as depicted in instructions 41–44.

As shown, exemplary instruction buffer 23 contains four instructions 41–44 which must be analyzed for dependencies, and the result of the analysis will be utilized by register renaming buffer 24 (of FIG. 2). This dependency analysis is partially performed with an array of comparators 46 which take a corresponding field from instructions 41–44 and compare their respective source and target register designations. Contrary to the prior art, the register dependency analysis of the present invention must take into consideration of the fact that instructions 41–44 within instruction buffer 23 may not be in program order. For example, an instruction to the left of an instruction being analyzed may actually be before or after it in program order. Thus, if the target operand field RT2 of instruction 43 is equal to one of the source operand fields, such as RB1 of instruction 42, which is indicated by the output of one of comparators 46 as true, the value of the rename tag of RB1 of instruction 42 should be the value of the target register tag of RT2 of instruction 43 if instruction 42 comes after instruction 43 in program order. Otherwise, another value should be utilized if instruction 43 comes after instruction 42 in program order, and such value is determined by register renaming logic 24.

The four output signals generated by decoder 37 (from FIG. 3) are utilized to gate the outputs of each comparator 46 which compare the target register number in each instruction with all possible source register numbers which may also utilize the target register. The renamed target register tag must be substituted for the source tag if there is a match and the target instruction is before the instruction utilizing the source operand in program order. Each AND gate 47 is connected to a comparator 46 and at least one output signals from decoder 37 (of FIG. 3). The "+" sign between each output signals signifies a logical OR operation. Each AND gate 47 gates a possible equal compare signal only when the equal compare occurs for the target instruction (in program order) before source operand usage. For example, a signal 45a is utilized to signal register renaming buffer 24 to utilize the renamed register tag for the target register in instruction 44 for the source register tag RB2 of instruction 43 if the low-order bits of the fetch address equals to "11" because this means instruction 43 comes logically (in program order) after instruction 44. Signals 45b–45n may be generated in a similar manner.

The instructions within instruction buffer 23 with the renamed register tags can then be transferred into issue queue 26 (from FIG. 2) in any order. Issue queue 26 will utilize only the renamed register tags to determine when the instructions are ready to issue, and these tags have been appropriately modified as described above to reflect the proper order of the instructions within instruction buffer 23.

As has been described, the present invention provides an improved method and apparatus for loading an instruction buffer within a superscalar processor capable of out-of-order instruction issue. It is a feature of the present invention to allow an instruction dependency analysis unit to analyze the instructions within an instruction buffer, knowing that the instructions may not be in program order. It is also a feature of the present invention to utilize an issue queue and any other out-of-order instruction sequencing hardware commonly available in all superscalar processors that are capable of out-of-order instruction issue to resolve the instruction order even though the instructions within the instruction buffer are not in proper program order.

By allowing instructions to be stored within the instruction buffer in a sequence other than program order, the effective bandwidth of an instruction cache is improved and the amount of multiplexing between the instruction cache and the instruction buffer, as well as between the instruction buffer and the issue queue, are reduced. The issue queue suitable for the present invention may be of any type as long as the determination of "ready to issue" is made solely on the basis of resolved data dependencies and the availability of execution units.

While the invention has been particularly shown and described with reference to a preferred embodiment, it will be understood by those skilled in the art that various changes in form and detail may be made therein without departing from the spirit and scope of the invention.

What is claimed is:

1. A method for loading an instruction buffer of a processor capable of out-of-order instruction issue, wherein said processor includes an instruction cache having a plurality of cache lines, said method comprising the steps of:

coupling said instruction cache to said instruction buffer with a multiplexor, wherein said instruction buffer includes a plurality of slots;

sequentially filling said plurality of slots of said instruction buffer with instructions from said instruction cache under supervision of said multiplexor, wherein a slot in which a first instruction resides is dictated by a fetch address; and thereafter, filling all empty slots of said instruction buffer with instructions from a subsequent cache line from said instruction cache if said first instruction does not reside in a first slot of said instruction buffer, wherein at least one of the empty slots is situated in said instruction buffer earlier than said slot storing said first instruction.

2. The method according to claim 1, wherein said method further includes a step of determining an actual program order for instructions residing within said instruction buffer by an instruction dependency analysis unit.

3. The method according to claim 2, wherein said method further includes a step of receiving a signal indicating a slot of said instruction buffer in which said first instruction resides by said instruction dependency analysis unit.

4. The method according to claim 3, wherein said method further includes a step of generating said signal by a decoder having said fetch address as an input.

5. The method according to claim 4, wherein said generating step further includes a step of generating said signal by a decoder having a plurality of AND gates.

6. An apparatus for loading an instruction buffer of a processor capable of out-of-order instruction issue, wherein said processor includes an instruction cache having a plurality of cache lines, said apparatus comprising:

a multiplexor coupled between said instruction cache and said instruction buffer, wherein said instruction buffer includes a plurality of slots; and a filling means for sequentially filling all empty slots of said instruction buffer with instructions from a subsequent cache line from said instruction cache if said first instruction does not reside in a first slot of said instruction buffer, wherein at least one of the empty slots is situated in said instruction buffer earlier than said slot storing said first instruction.

7. The apparatus according to claim 6, wherein said apparatus further includes an instruction dependency analysis unit for determining an actual program order for instructions resided within said instruction buffer.

8. The apparatus according to claim 7, wherein said instruction dependency analysis unit receives a signal indicating a slot of said instruction buffer in which said first instruction resided.

9. The apparatus according to claim 8, wherein said signal is generated by a decoder having said fetch address as an input.

10. The apparatus according to claim 9, wherein said decoder includes a plurality of AND gates.

11. A processor capable of out-of-order instruction issue, comprising:

an instruction cache having a plurality of cache lines;

an instruction unit, coupled to said instruction cache, having an instruction buffer;

a multiplexor coupled between said instruction cache and said instruction buffer, wherein said instruction buffer includes a plurality of slots; and a filling means for sequentially filling all empty slots of said instruction buffer with instructions from a subsequent cache line from said instruction cache if said first instruction does not reside in a first slot of said instruction buffer, wherein at least one of the empty slots is situated in said instruction buffer earlier than said slot storing said first instruction.

12. The processor according to claim 11, wherein said instruction unit further includes an instruction dependency analysis unit for determining an actual program order for instructions resided within said instruction buffer.

13. The processor according to claim 12, wherein said instruction dependency analysis unit receives a signal indicating a slot of said instruction buffer in which said first instruction resided.

14. The processor according to claim 13, wherein said signal is generated by a decoder having said fetch address as an input.

15. The processor according to claim 14, wherein said decoder includes a plurality of AND gates.

* * * * *